United States Patent [19]
Erickson et al.

[11] Patent Number: 5,430,289
[45] Date of Patent: Jul. 4, 1995

[54] ILLUMINATING SCANNER LID FOR AN OPTICAL SCANNER

[75] Inventors: Michael D. Erickson, Ft. Collins; Eugene A. Miksch, Loveland; David W. Boyd, Greeley, all of Colo.

[73] Assignee: Hewlett-Packard Company, Palo Alto, Calif.

[21] Appl. No.: 171,802

[22] Filed: Dec. 22, 1993

[51] Int. Cl.$^6$ ............................................. G01J 1/32
[52] U.S. Cl. ................................. 250/205; 358/471
[58] Field of Search ............... 250/235, 234, 236, 205; 358/497, 471, 474, 475, 480, 482

[56] References Cited

U.S. PATENT DOCUMENTS

| | | | |
|---|---|---|---|
| 4,618,254 | 10/1986 | Therrien et al. | 355/68 |
| 4,873,579 | 10/1989 | Kubota et al. | 358/471 |
| 4,989,099 | 1/1991 | Koshiyouji et al. | 358/474 |
| 5,019,703 | 5/1991 | Boyd et al. | 250/208.1 |
| 5,038,028 | 8/1991 | Boyd et al. | 250/208.1 |
| 5,038,227 | 8/1991 | Koshiyouji et al. | 358/471 |
| 5,126,860 | 6/1992 | Nagano | 358/471 |
| 5,282,081 | 1/1994 | Chen et al. | 359/223 |

*Primary Examiner*—David C. Nelms
*Assistant Examiner*—Steven L. Nichols
*Attorney, Agent, or Firm*—Patrick J. Murphy

[57] ABSTRACT

An apparatus providing the capability to scan transmissive media is presented. The apparatus comprises an illuminating lid for an optical scanner. The lid is hingeably attached to the base of the scanner and provides a backlight for transmissive media. A light source, located within the lid, projects light through a translucent screen, through an X-ray for example, onto photodetector arrays located within the base of the scanner. Control means are provided to maintain the light intensity of the light source located within the lid so that a flat light profile is provided during the scan.

3 Claims, 5 Drawing Sheets

ILLUMINATING SCANNER LID FOR AN OPTICAL SCANNER

FIELD OF THE INVENTION

The present invention relates generally to optical scanners and more particularly to a device which permits an optical scanner to scan transmissive media.

BACKGROUND OF THE INVENTION

An optical scanner is used to generate machine-readable data which is representative of a scanned object such as a document or photograph. This is accomplished by employing a controlled light source located within the base of the scanner. The light source is reflected off the surface of a document and back onto an array of photosensitive devices which convert the light intensity into an electronic signal. The intensity of the light source is controlled by utilizing calibration circuitry located within the scanner base.

Optical scanners and various components used within such scanners are disclosed in U.S. Pat. No. 4,926,041 for OPTICAL SCANNER of David W. Boyd; U.S. Pat. No. 4,937,682 for METHOD AND APPARATUS FOR PROVIDING CONTRAST/INTENSITY CONTROL IN A DOCUMENT SCANNER of Dan L. Dalton; U.S. Pat. No. 5,019,703 for OPTICAL SCANNER WITH MIRROR MOUNTED OCCLUDING APERTURE OR FILTER of David W. Boyd and John S. Deutschbein; and U.S. Pat. No. 5,038,028 for OPTICAL SCANNER APERTURE AND LIGHT SOURCE ASSEMBLY of David W. Boyd and C. William Elder, Jr.

It is an object of the present invention to provide a light source for an optical scanner which can illuminate transmissive media. It is another object of the present invention to provide a modular light source which may be removed from a first optical scanner and placed onto a second optical scanner with relative ease. It is another object of the present invention to provide an illuminating scanner lid for an optical scanner.

SUMMARY OF THE INVENTION

The present invention provides an illuminating scanner lid for an optical scanner. In particular, a detachable scanner lid has a fixed light source, diffusing screen and control circuitry. The lid is hinged to facilitate placement or removal of items on the scanner platen. The light source within the lid, in conjunction with the diffusing screen, provides a backlight for scanning transmissive media of various sizes. This backlight has a flat light profile in order to produce images with little or no discrepancies.

The light source is comprised of at least one fluorescent bulb. The light intensity is adjustable in accordance with the requirements of the transmissive medium to be scanned. Once the desired light intensity is determined, the control circuitry, using a photodiode feedback, maintains this intensity by regulating the power of the light source.

DETAILED DESCRIPTION OF THE PREFERRED EMBODIMENT

Figure 1:
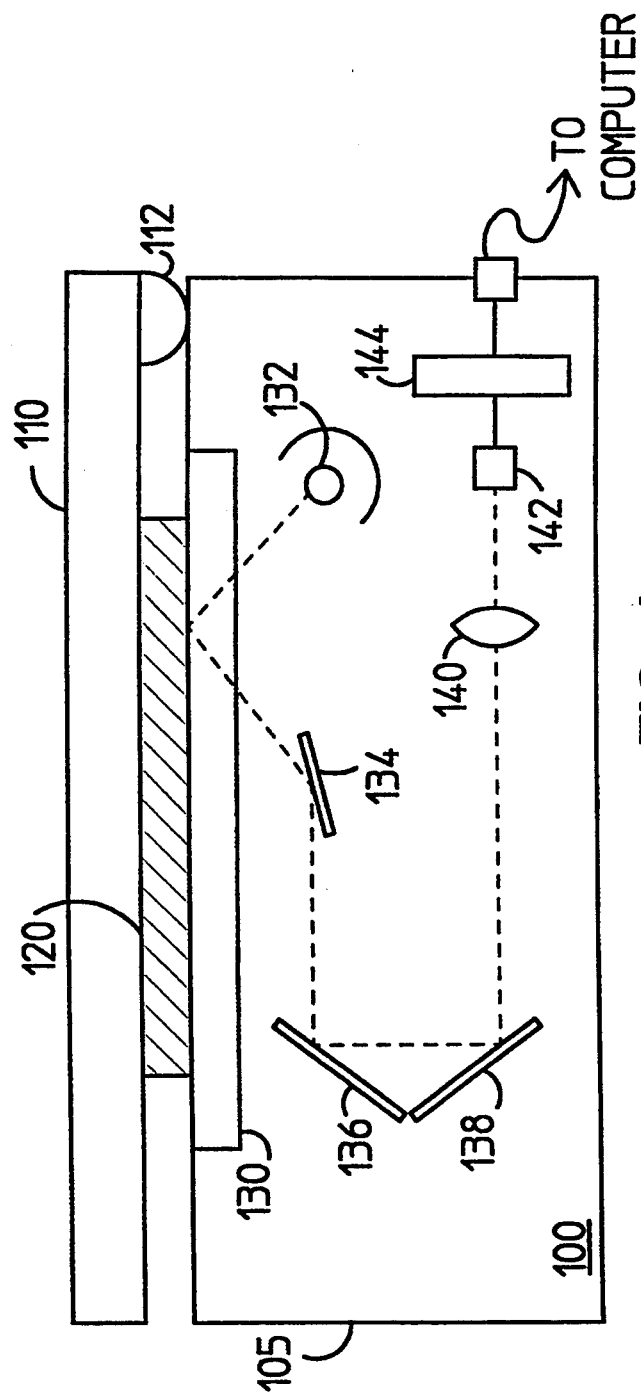
FIG. 1 shows a block diagram of a side view of an optical scanner.

FIG. 1 shows a block diagram of a side view of an optical scanner. Scanner 100 has a scanner base 105 and a scanner lid 110. The lid 110 is attached to the base 105 via a hinge 112 such that the lid 110 can pivot about a center axis of the hinge 112; this permits easy access to the image area (i.e., that area disposed between the base 105 and the lid 110). A preferred embodiment scanner 100 is the ScanJet IIc or ScanJet IIp available from Hewlett-Packard Company, 3000 Hanover Road, Palo Alto, Cal. 94303-1181. A reflective document 120 lies on a transparent platen 130 in the image area. A lamp 132 projects a narrow line of light through the platen 130 and onto the surface of the document 120. This light is reflected off the surface of the document 120 onto mirrors 134, 136 and 138. The mirrors reflect this light through a focusing lens 140 onto a photodetector array 142. In one preferred embodiment, the lamp 132 moves horizontally to provide a moving line of light along the stationary document 120 for detection by the photodetector array 142. In a second embodiment, the document 120 may move past a stationary lamp 132.

Photodetector array 142 converts light intensity into an electrical signal for an internal controller 144 which, among other things, controls the power to the lamp 132. In a preferred embodiment, the photodetector array 142 comprises charged-coupled devices (CCDs). A sensor calibration target (not shown) is located at one end of the platen 130 to calibrate the photodetector array 142 before scanning the document 120. The internal controller 144 sends image data to a computer or a printer. The computer, or other device, can send commands to the internal controller 144.

Figure 2:
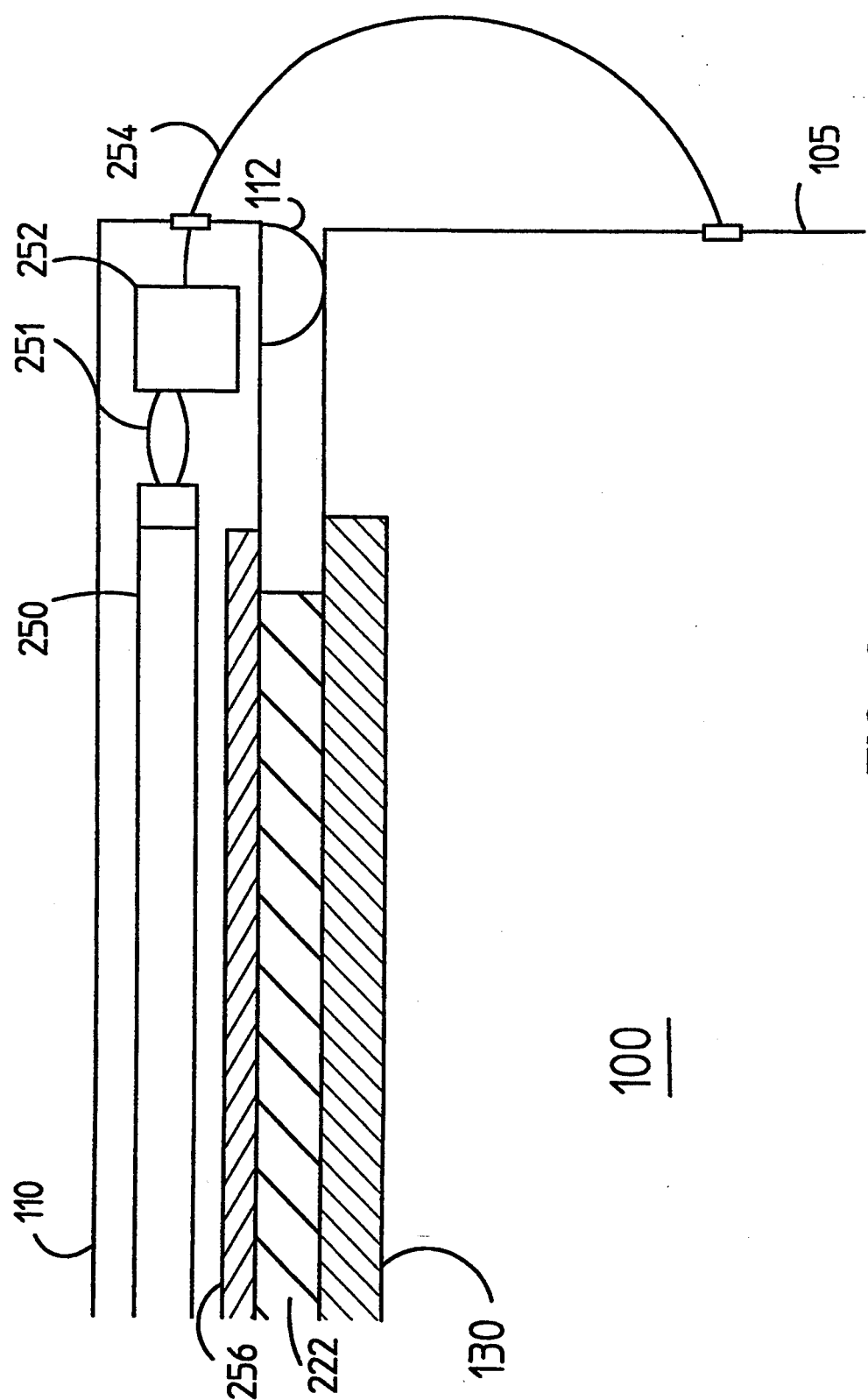
FIG. 2 shows a block diagram of a side view of the lid for the optical scanner.

FIG. 2 shows a block diagram of an exposed side view of the lid for the optical scanner according to the present invention. Briefly, this configuration provides a backlight for scanning transmissive media of various sizes. Transmissive media includes, but is not limited to, 35 mm slides, transparencies, and X-rays. The lid 110 is pivotally attached to the scanner base 105 via a hinge 112; this facilitates easy removal of the lid 110 for placement onto another scanner base (not shown). A transmissive document 222 is placed on a transparent platen 130. Light from a lamp 250, which is located within the lid 110, is passed through a translucent screen 256, through the transmissive document 222, onto a photodetector array (not shown) located within the base 105 of the scanner 100; the photodetector array converts the light intensity into an electronic signal. The lamp 250 is secured within the lid via framing means (not shown) and runs parallel to the length of the scanner 100.

In a first configuration, the lamp (item 132 in FIG. 1) located within the base 105 is turned off and lamp 250 is turned on to scan transmissive media. The translucent screen 256 will diffuse the light from lamp 250 to provide an even illumination across the entire transmissive medium. When scanning reflective documents during a second configuration, lamp 250 is turned off and the lamp (item 132 in FIG. 1) within the base 105 is turned on. In this second configuration, the translucent screen 256 provides a white background when scanning reflective documents. A third configuration is possible in which both the lamp in the base 105 and the lamp 250 in the lid are turned on. This third configuration allows the scanner 100 to scan media that has both reflective and transmissive properties.

A control block 252, which is located within the lid 110, controls the intensity of the lamp 250 via lamp leads 25 1. The control block 252 is coupled to the scanner base through a communications line 254. In a preferred embodiment, the communications line 254 is compatible with the SCI bus protocol (akin to RS-232). Other bus protocols, such as SCSI and HPIB could be used without departing from the scope of the present invention.

Figure 3:
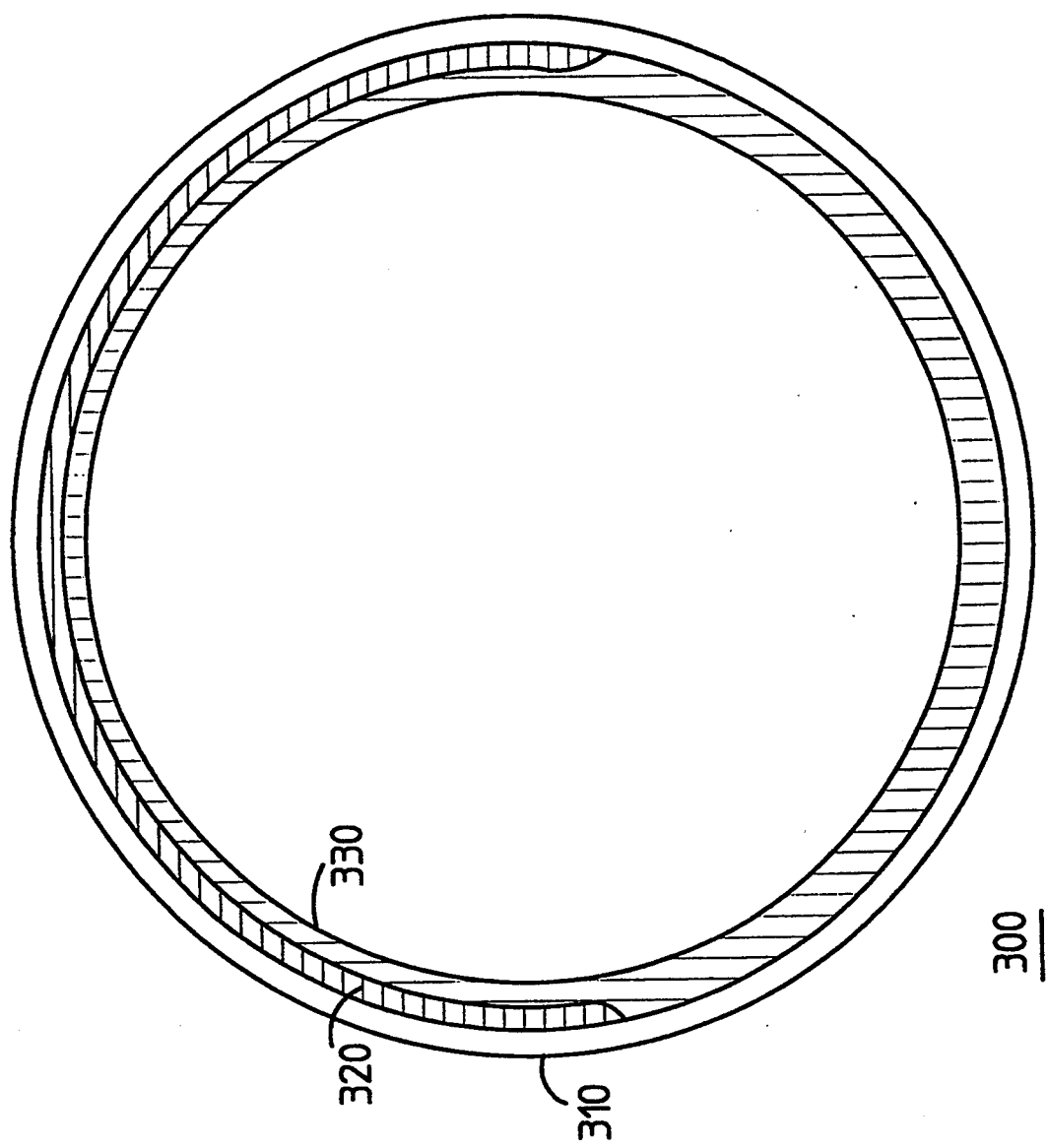
FIG. 3 shows one embodiment of a cross-sectional view of a lamp.

FIG. 3 shows one embodiment of a cross-sectional view of a lamp according to the present invention. The lamp 300, which is approximately 17" long, is a fluorescent lamp belonging to a sub-class of lamps known as reflector lamps. Reflector lamps generally modify the light intensity in planes transverse to the axis. Lamp 300 accomplishes this by means of a translucent white reflective coating 320 which is applied over a portion of the inner surface of the bulb 310. A phosphor 330 coating is then applied, covering the reflective coating 320 and the remainder of the inner surface of the bulb 310. In one preferred embodiment, the reflective coating 320 is the arc of a 135° central angle. In another preferred embodiment, the central angle is 235°. In another embodiment, full-coated, standard fluorescent lamps are used in place of the reflector lamps. In yet another embodiment, standard lamps with no fluorescence can be used.

Figure 4:
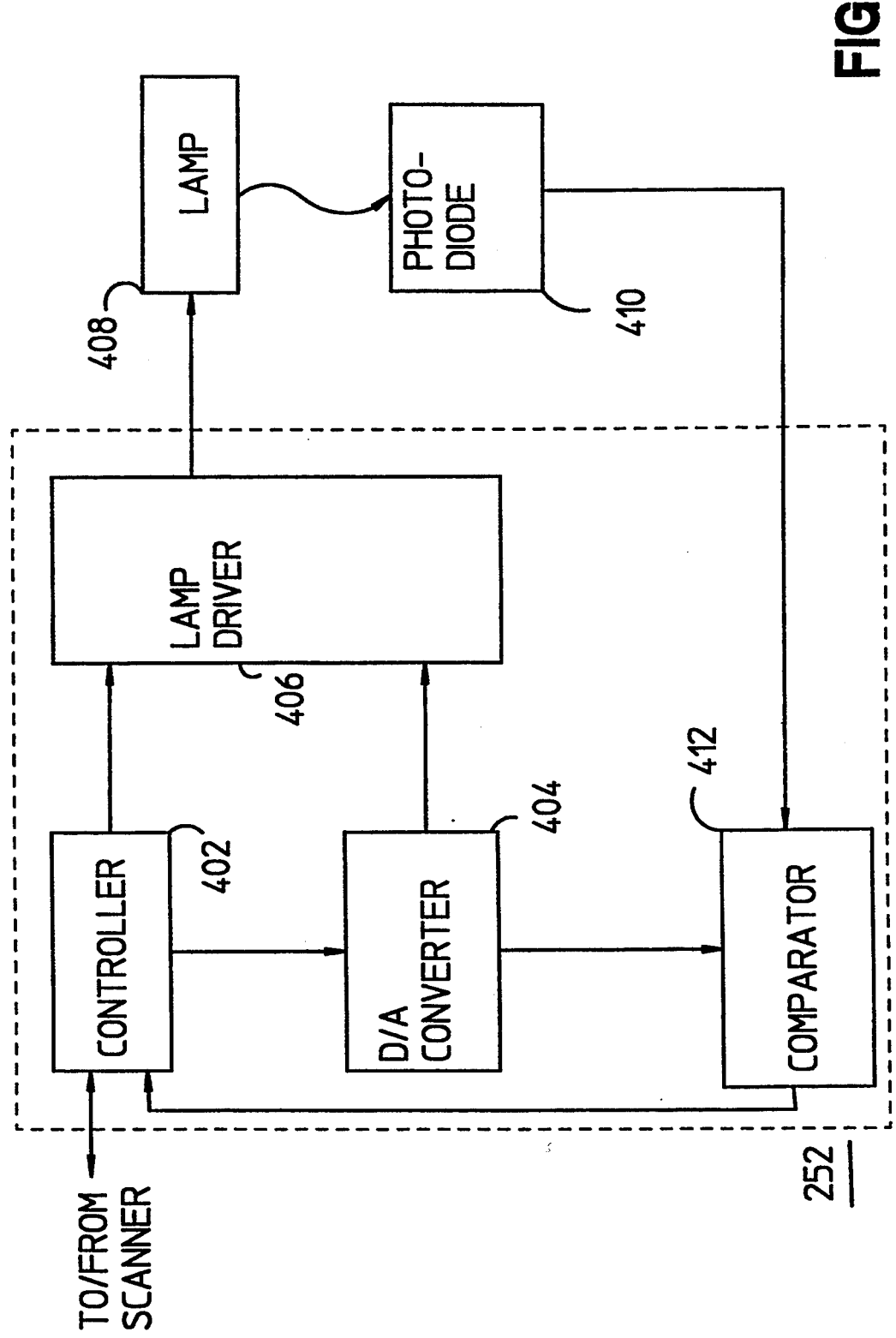
FIG. 4 shows a block diagram of the control block according to the present invention.

FIG. 4 shows a block diagram of the control block according to the present invention. The control block 252 is centered around a microcontroller 402. In a preferred embodiment, the microcontroller 402 is a 68HC05 microcontroller available from Motorola, Inc., 1303 East Algonquin Road, Schaumburg, Ill. 60196. The microcontroller 402 receives commands from the scanner via the serial communications channel (item 254 of FIG. 2). Commands sent from the scanner include turning on the lamp, change light intensity, and report status.

The microcontroller 402 drives a digital-to-analog converter (DAC) 404 and a lamp driver 406. One output of the DAC 404 is connected to the lamp driver 406, while a second DAC output is connected to a comparator 412. The comparator 412 also receives input from a photodiode which measures the light intensity of the lamp 408 and converts it to an analog signal. This signal is then supplied to the comparator 412 as feedback to maintain the light intensity of the lamp 408 at a constant level.

Figure 5:
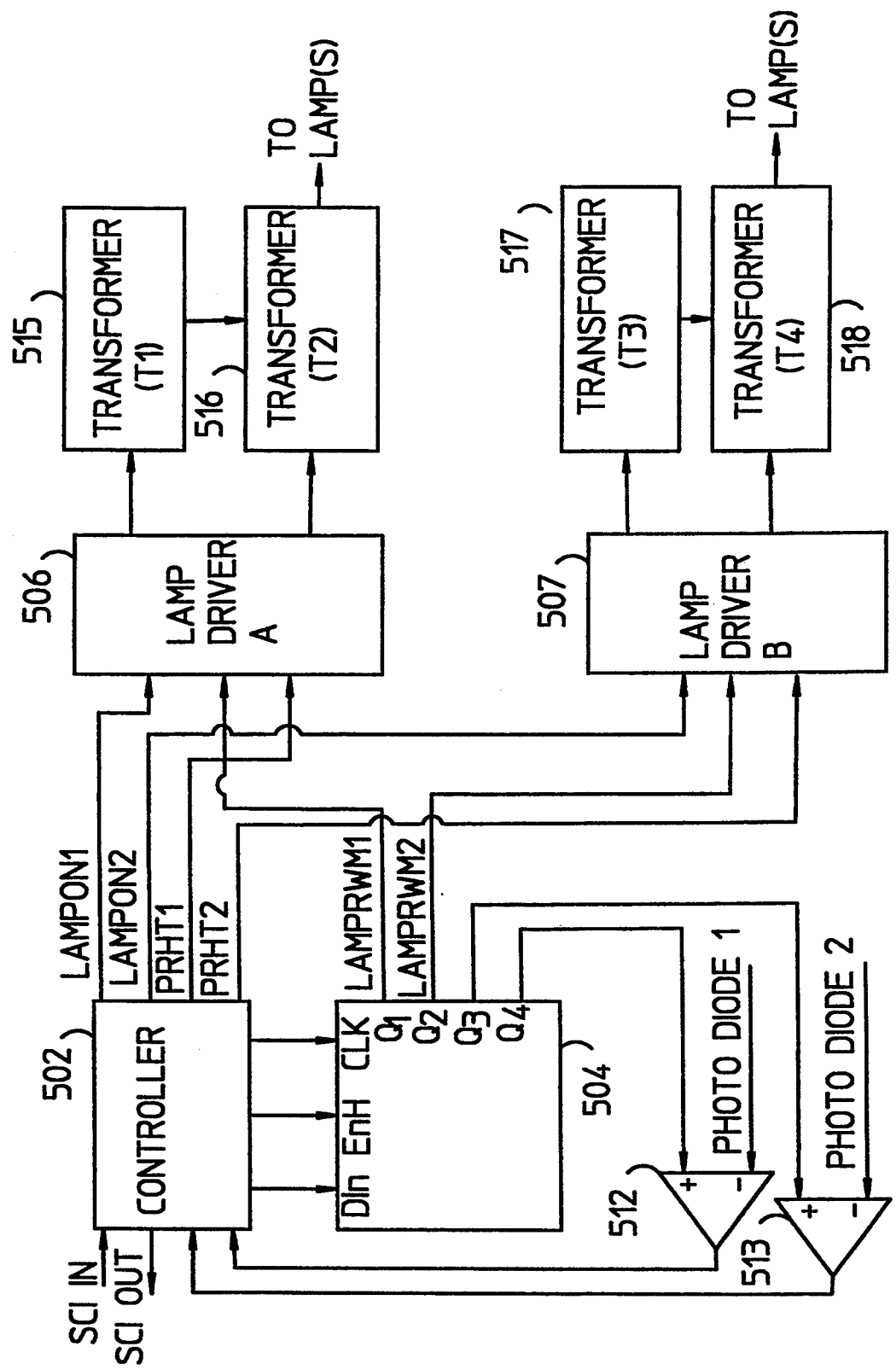
FIG. 5 shows a more detailed block diagram of the control block.

FIG. 5 shows a more detailed block diagram of the control block. The controller 502 drives a DAC 504 which, in a preferred embodiment, is a serial-input quad DAC. The controller 502 also drives two lamp drivers: lamp driver A 506 and lamp driver B 507. Two of the analog outputs of the DAC 504 directly drive the light intensity inputs of the two lamp drivers 506,507. The two remaining outputs of the DAC 504 are connected to two comparators 512,513.

The comparators 512,513, in conjunction with the DAC 504, are responsible for keeping the light intensity of the lamps in the lid at a constant level using a photodiode feedback (i.e., the negative inputs to the comparators).

Lamp driver A 506 is connected to T1 transformer 515 and T2 transformer 516. Lamp driver B 507 is connected to T3 transformer 517 and T4 transformer 518. The following discussion will focus on lamp driver A 506 and the T1 and T2 transformers 515,516. It will be understood that the operation of lamp driver B 507 and the T2 and T3 transformers 517, 518 is similar to the discussion below.

Lamp driver A 506 can drive up to two lamps using a 100 kHz AC waveform (not shown). When two lamps are driven, the lamps are placed in series such that each lamp is driven by a 50 kHz waveform which lamp driver A 506 generates from the 100 kHz AC waveform. The T2 transformer 516 provides a small voltage for the filaments in the lamps. The PRHT1 input to lamp driver A 506 enables the filament current which heats up the filaments before turning on the lamps. This preheat cycle, which can last up to several seconds, extends the operating life of the lamps. The T1 transformer 515 provides an operating voltage and a current that flows between the filaments. The operating voltage is enabled with the LAMPON1 input to the lamp driver A 506.

To start the lamps, a high voltage is required (e.g., 500 V). Since an unlit lamp acts as an open circuit on the secondary coil of the T1 transformer 515, the voltage on the secondary coil increases rapidly when current flows through the primary coil of the T1 transformer 515. This sharp voltage increase continues until that lamp's starting voltage is reached. Once the lamp is lit, the operating voltage stays at about 75 V. The brightness is then controlled by the amount of current flowing through the lamp.

The current fed to the lamps is controlled by lamp driver A 506. The current is fed to the center tap of the primary coil of the T1 transformer 515. Meanwhile two field-effect transistors (not shown) switch at 50 kHz, 50% duty cycle in order to reverse the polarity on the secondary coil of T1 515; polarity is reversed periodically to prevent all of the mercury vapor from migrating to one end of the bulb. The cycle (i.e., 50 kHz) is a rate fast enough to be undetectable by the scanner. Slower rates, such as 60 Hz, produce light and dark horizontal bands in the scanned image.

While the present invention has been illustrated and described in connection with the preferred embodiment, it is not to be limited to the particular structure shown. It should be understood by those skilled in the art that various changes and modifications may be made within the purview of the appended claims without departing from the spirit and scope of the invention in its broader aspects. For example, a single lamp in conjunction with an arced reflector could replace the light source in the scanner lid of FIG. 2.

We claim:

1. A document scanner comprising:
a scanner base;
a first controller residing within the scanner base;
a scanner lid attached to the scanner base;
a lamp residing within the scanner lid, the lamp generates a light of an actual intensity;
a phototransistor for conveying the actual light intensity from the lamp to an electrical signal; and
a second controller for controlling the lamp, the second controller residing within the scanner lid and being electrically connected to the first controller.

2. The document scanner of claim 1 wherein the second controller comprises:

a microcontroller electrically connected to the first controller;

a digital to analog converter connected to the microcontroller;

a lamp driver, connected to the microcontroller and the digital-to-analog converter, for driving the lamp; and a comparator, connected to the digital-to-analog converter and the microcontroller, for comparing the actual light intensity to a desired light intensity.

3. A modular light source for a document scanner, the document scanner having a scanner base and a scanner lid, the scanner base having a first light source controlled by a first controller, the modular light source comprising:

a lamp residing within the scanner lid;

a second controller residing within the scanner lid, the second controller connected to the lamp and the first controller; and a hinge for demountably attaching the scanner lid to the scanner base, wherein the scanner lid, with the lamp and second controller, is removable from the scanner base so that the scanner lid may be attached to a second scanner base.

* * * * *